United States Patent [19]

Shimano

[11] 4,421,357
[45] Dec. 20, 1983

[54] SADDLE SUPPORT DEVICE FOR A BICYCLE

[75] Inventor: Keizo Shimano, Sakai, Japan

[73] Assignee: Shimano Industrial Company Limited, Osaka, Japan

[21] Appl. No.: 256,238

[22] Filed: Apr. 21, 1981

[51] Int. Cl.³ .............................................. B62J 1/00
[52] U.S. Cl. ...................................... 297/195; 403/87
[58] Field of Search ................... 297/195; 403/82, 84, 403/87, 110; 248/299; 280/281 R

[56] References Cited

U.S. PATENT DOCUMENTS

| 58,533 | 10/1866 | Zeigler | 403/87 |
|---|---|---|---|
| 415,866 | 11/1889 | Hickman | 403/87 |
| 1,446,164 | 2/1923 | D'Eyraud | 403/8.7 X |
| 1,578,634 | 3/1926 | Borgmann | 248/299 X |
| 1,968,340 | 7/1934 | Glidden | 403/87 X |
| 3,891,333 | 6/1975 | Corderac'k | 297/195 |
| 3,992,054 | 11/1976 | Campagnolo | 297/195 |
| 4,155,590 | 5/1979 | Cunningham | 297/195 |
| 4,275,922 | 6/1981 | Juy | 297/195 |

Primary Examiner—William E. Lyddane
Assistant Examiner—Peter A. Aschenbrenner
Attorney, Agent, or Firm—Stevens, Davis, Miller & Mosher

[57] ABSTRACT

A saddle support device for a bicycle, comprising a support member fixed to the upper portion of a seat post and a mechanism clamping a saddle frame and having a receiving member seated onto the support member and a holding member, said saddle frame being compressed between said receiving and holding members. The upper surface of the support member and the lower surface of the receiving member have spherical profiles, thereby making it possible to adjust the saddle not only in vertical angles longitudinally and laterally of the bicycle but also in rotation around the lengthwise axis of a locking member which draws the holding and receiving members together.

7 Claims, 6 Drawing Figures

SADDLE SUPPORT DEVICE FOR A BICYCLE

FIELD OF THE INVENTION

This invention relates to a saddle support device for a bicycle, and more particularly to a saddle support device comprising a support member provided at the upper portion of a seat post of a bicycle and a clamp mechanism which comprises a receiving member and a holding member which holds a saddle frame therebetween, so that a saddle is supported adjustably on the support member through the clamping mechanism supported therethrough.

BACKGROUND OF THE INVENTION

Conventionally, a saddle support constructed as described above as disclosed in U.S. Pat. No. 3,992,054, comprises a support member having cylindrical upper and lower surfaces and a receiving member supported to the support member and having also a cylindrical lower surface, so that a bolt is used to support the saddle at the upper portion of the seat post in a manner permitting an adjustment in its dip and elevation, i.e., in vertical angles which are longitudinal of the bicycle.

The saddle inclination is adjusted with respect to the longitudinal center line of the bicycle frame by rotating the seat post with respect to a seat tube fixed to a bottom bracket of the bicycle frame.

Recently, attempts have been made to reduce the air resistance associated with a bicycle's running, and to this end the bicycle frame or seat post, especially of a racing bicycle, is formed in a streamlined shape in cross section to reduce the air resistance.

When the seat tube or the seat post connected thereto has a streamlined cross section, the seat post cannot be rotated with respect to the seat tube. Hence, the inclination of the saddle, is not adjustable with respect to the longitudinal center line of the bicycle frame. In other words, when the seat tube is fixed to the bottom bracket in a condition of being improper with respect to the longitudinal center line of the frame, the saddle cannot be adjusted to a proper position.

SUMMARY OF THE INVENTION

This invention has been designed to desirably adjust the saddle in its position laterally of the bicycle frame even when the seat tube or seat post is not-round but is streamlined in cross section, so that , even when the seat tube is not directed diametrically to mate with the longitudinal center line, the saddle can be adjusted in a proper position with respect to the center line.

A saddle support device of the invention is provided at a support member fixed to the upper portion of a seat post of the bicycle frame with a clamp mechanism comprising a receiving member, a holding member, and a locking member which has a lengthwise axis and presses the holding member against the receiving member to fix it to the support member, so that a saddle having a saddle frame can be rotatable around the lengthwise axis of the locking member and be adjustable in vertical angles longitudinally and laterally of the bicycle frame.

In other words, the support member has upper and lower surfaces and a through bore perforating therethrough , the upper surface being formed in a spherical surface around the through bore. The lower surface of the receiving member is made spherical in complementary connection with the spherical surface of the support member, and seated on the upper surface thereof, so that the saddle, through these spherical surfaces, is rotatably adjustable around the lengthwise axis of the locking member and is adjustable in its vertical angle longitudinally or laterally of the bicycle frame.

Therefore, with this invention the saddle can be adjusted in position in every direction even when the seat post has a streamlined cross section and is not rotatably adjustable with respect to the seat tube.

Also, by making the above adjustment with only one locking member the adjustment is easy and quick, thereby being perfomable by anyone even those of no experience.

These and other objects of the invention will become more apparent in the detailed description and example which follow.

BRIEF DESCRIPTION OF THE DRAWINGS

FIG. 3 is a sectional view taken on the line III—III in FIG. 1, FIGS. 4 through 6 are views explanatory of the direction of adjustment of a saddle, in which

DETAILED DESCRIPTION OF THE INVENTION

Figure 3:
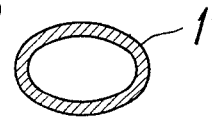

In the drawings, reference numeral 1 designates a seat post formed mainly of an aluminum alloy. The seat post 1, as shown in FIG. 3 is elliptic in cross section and has at the upper portion a support member 2 integral therewith.

The saddle support device of the invention comprises the support member 2 fixed to the upper portion of seat post 1 and a clamp mechanism comprising a receiving member 3, holding member 4 and one locking member 5, so that a saddle 11 having a saddle frame 10 is supported to the support member 2 through the clamp mechanism in relation of being rotatably adjustable a horizontal angle, or in a vertical angle longitudinally or laterally of the bicycle frame.

The support member 2 extends rearwardly of the bicycle from the upper portion of seat post 1 and has an upper surface 21, a lower surface 22 and a through-bore 23 perforating both the surfaces 21 and 22. The surfaces 21 and 22 are made spherical around through-bore 23 respectively, that is, the upper surface 21 is concave and the lower surface 22 is convex.

The through-bore 23 may be round and larger in diameter than the locking member 5, but, in the drawings, is elongated longitudinally of the bicycle frame, so that the saddle 11 is adjustable largely of its vertical angle longitudinally of the bicycle frame in comparison with laterally of the same.

Figure 2:
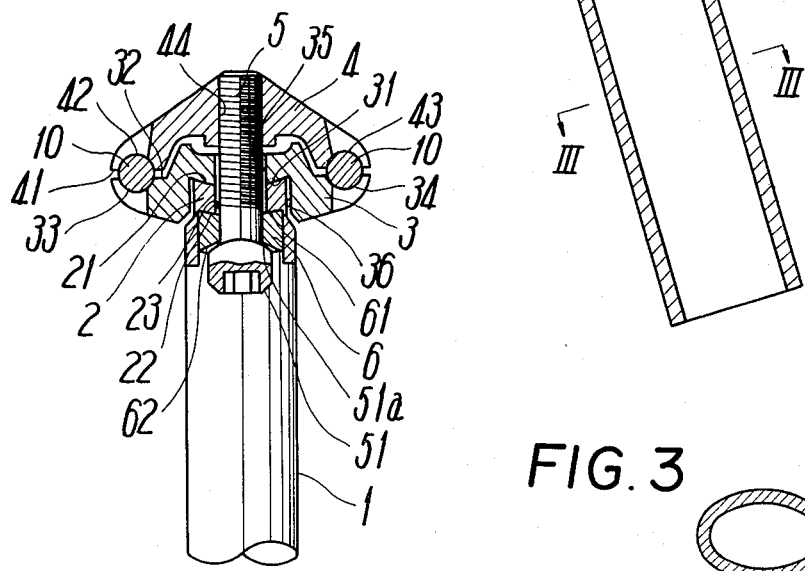
FIG. 2 is a sectional view taken on the line II—II in FIG. 1.

The receiving member 3, as show in FIG. 2, has a lower surface 31 seated on the upper surface 21 of support member 2 and an upper surface 32 opposite to the holding member 4, and is provided at the center of the upper surface 32 with a through-bore 35 and at both lateral sides of the same with two grooves 33 and 34 which receive therein the saddle frame 10, extending longitudinally of the bicycle, and are semicircular in cross section. The lower surface 31 is spherical or downwardly convex around the through-bore 35, in connection with the spherical surface of support member 2.

The receiving member 3 is supported in contact at its lower surface 31 with the upper surface 21 of support member 2, so that the lower surface 31 is slidable against the upper surface 21 of support member 2, thereby enabling the receiving member 3 to rotate around the lengthwise axis of locking member 5 and around the axis perpendicularly intercrossing the lengthwise axis. The rotation of receiving member 3 around the lengthwise axis can adjust the saddle 11 in position with respect to the longitudinal center line of the bicycle frame F as shown in the arrows $X_1$ and $X_2$ in FIG. 4. The rotation of receiving member 3 around the axis extending laterally of the bicycle frame F and perpendicularly intercrossing the lengthwise axis, can adjust the saddle 11 in position with respect to seat post 1 as shown in the arrows $Y_1$ and $Y_2$ in FIG. 5. Or, the rotation of receiving member 3 around the axis extending longitudinally of the bicycle frame F and perpendicularly intercrossing the lengthwise axis, can adjust the saddle 11 in position as shown in the arrows $Z_1$ and $Z_2$ in FIG. 6. In other words, the saddle 11 is adjustable of its vertical angle longitudinally or laterally of the bicycle frame F as shown by the arrows $Y_1$ and $Y_2$, or $Z_1$ and $Z_2$.

The lower surface 31 of receiving member 3 is recessed 36 upwardly at the central portion thereof, the recess 36 being larger in a lateral width than the support member 2, so that gaps are formed between both lateral surfaces of support member 2 and those of recess 36 respectively. The gaps permit the receiving member 3 to be adjusted in its position and to be adjusted in its lateral vertical angle with respect to support member 2.

The holding member 4 is placed over the receiving member 3 to press it toward the support member 2 through the locking member 5 screwably tightened thereto, and has a lower surface 41 opposite to the upper surface 32 of receiving member 3. At both lateral sides of the lower surface 41 are provided two engaging grooves 42 and 43 extending longitudinally of the frame F and semicircular in cross section for receiving the saddle frame 10, and at the center of the lower surface 41 is provided a threaded bore 44. The threaded bore 44 corresponds to a headed bolt used as the locking member 5 as shown.

The clamping mechanism constructed as foregoing is used to fix saddle 11 to support member 2 in such a manner that the holding member 4 is placed on the receiving member 3, the grooves 33 and 34 are aligned opposite to those 42 and 43 respectively, and the locking member 5 is inserted through the through-bore 23 at support member 2 and through-bore 35 at receiving member 3 and screwed with the threaded bore 44 to tightly clamp the saddle frame 10 between the holding member 4 and the receiving member 3, so that the clamping mechanism is fixed to the support member 2.

The locking member 5, when a headed bolt is used, is screwed with the threaded bore 44 through a washer 6 interposed between the lower surface 22 of support member 2 and the head 51 of the bolt.

Figure 1:
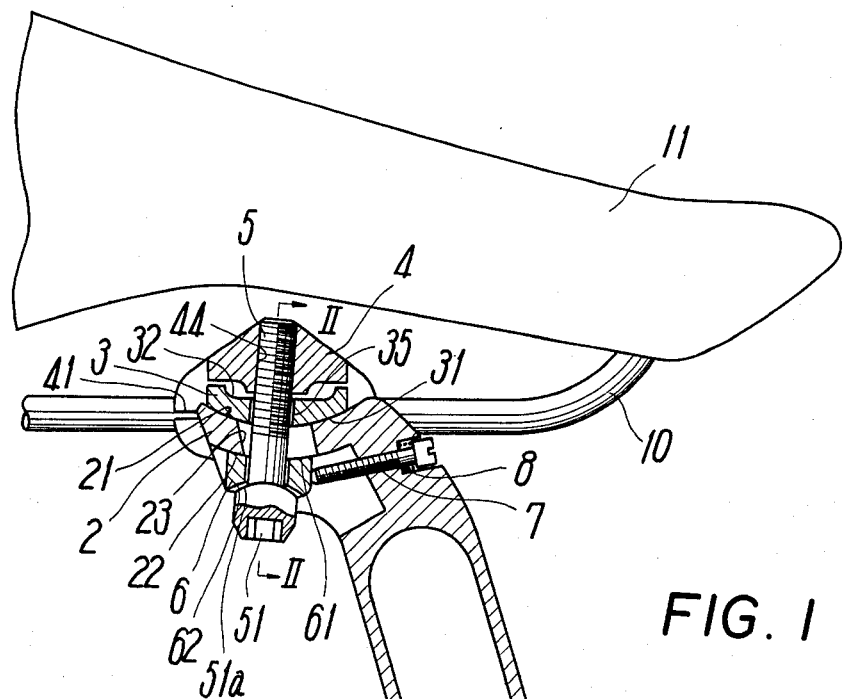
FIG. 1 is a sectional view of an embodiment of a saddle support device of the invention.

In addition, the washer 6, as shown in FIGS. 1 and 2, is preferably spherical at the upper and lower surfaces 61 and 62, opposite to the lower surface 22 of suppport member 2 and the head 51 of the bolt respectively. Also, the bolt head 51 is preferably spherical at its surface 51a opposite to the lower surface 62 of washer 6.

In this instance, the spherical upper surface 61 of washer 6 may be equal in a radius to the spherical lower surface 22 of support member 2, but the spherical lower surface 62 of washer 6 is preferably larger in a radius than the opposite surface 51a of bolt 51. Therefore, when the locking member 5 is screwably tightened, the receiving member 3, even if off-set with respect to the support member 2, is automatically aligned therewith.

In addition, such automatic alignment may achieved by making different radii of the spherical lower surface 22 of support member 2 and spherical upper surface 61 of washer 6.

As an alternative to the above described construction, the upper surface 21 of support member 2 may be upwardly convex, and the lower surface 22 thereof and lower surface 31 of receiving member 3 may be upwardly concave.

Alternatively, the lower surface 22 of support member 2 and upper surface 61 of washer 6 may be cylindrical. The lower surface 62 at washer 6 and opposite face 51a of bolt head 51 may be flat.

Furthermore, a screw member 7 may be provided at the upper portion of seat post 1 so as to abut against the washer 6 or bolt head 51, thereby forming a holding mechanism. A locking spring 8 is attached to the screw 7.

The holding mechanism is provided to ensure that the clamping mechanism is kept adjusted in position with respect to the support member 2. The screw member 7 also is used for fine position adjustments of the clamping mechanism.

Figure 4:
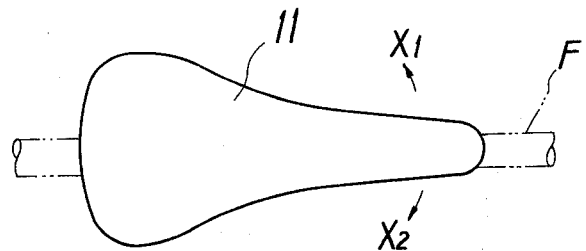
FIG. 4 is a plan view thereof.
Figure 5:
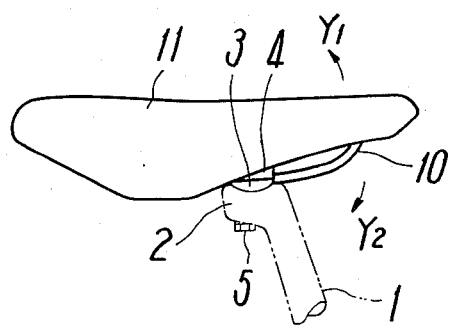
FIG. 5 is a side view of the same.
Figure 6:
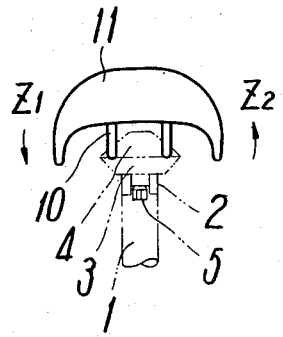
FIG. 6 is a rear view of the same.

As seen from the above, the saddle support device of the invention, as shown in FIGS. 4, 5 and 6, can rotate the saddle 11 around the lengthwise axis of locking member 5, and around the axes perpendicularly intercrossing the lengthwise axis and extending longitudinally and laterally of the bicycle frame F, thereby adjusting the saddle 11 in its horizontal angle with respect to the center line longitudinal of the bicycle frame F as well as in vertical angles longitudinally and laterally thereof. Hence, the saddle 11, even when the seat post and seat tube carrying it are streamlined in cross section to reduce air resistance, is mountable accurately in position.

In other words, in a case that the saddle 11 is improper in its vertical angle longitudinal of the frame F, that is, a dip or an elevation is improper, the locking member 5 is released and the saddle 11 is forced to rotate the receiving member 3 around the axis lateral of the frame F with respect to the support member 2 as shown by the arrows $Y_1$ and $Y_2$ in FIG. 5. In this instance, the screw member 7 is screwed forward or backward to adjust the vertical angle, and abuts against the washer 6 to maintain the saddle 11 in the adjusted position.

When the saddle 11 is improper in a vertical angle laterally of the bicycle frame F, the receiving member 3 is similarly rotated around the axis longitudinal of the frame F as shown in the arrows $Z_1$ and $Z_2$ in FIG. 6.

Furthermore, when the saddle 11 is improper in its lateral position with respect to the center line longitudinal of the frame F, the saddle 11 is forced to rotate the receiving member 3 around the lengthwise axis of locking member 5 with respect to the support member 2. This adjustment is restricted to an angle in a range of degrees of about 10 to 20 by means of the gaps between the recess 36 and the support member 2. Hence, the saddle 11 cannot rotate more than necessary, thereby avoiding its careless rotation.

While a preferred embodiment of the invention has been described using specific terms, such description is for illustrative purposes only, and it is to be understood that changes and variations may be made without departing from the spirit or scope of the invention which is defined in the following claims.

What is claimed is:

1. A saddle support device for supporting a saddle having a saddle frame to the upper portion of a seat post of a bicycle, said seat post having a streamlined, non-round, cross-sectional shape, said saddle support device comprising:
    (a) a support member fixed to the upper portion of said seat post, said support member having an upper surface, a lower surface, and a through bore penetrating said upper and lower surface, said upper surface having a spherical profile around said through bore;
    (b) a clamping mechanism supported to the upper surface of said support member for clamping said saddle frame in position, said clamping mechanism comprising a receiving member, a holding member, a washer and a locking member comprising a headed bolt which has a lengthwise axis and which presses said holding member against said receiving member and fixes said receiving member to said support member, said receiving member having a lower surface seated on the upper surface of said support member and an upper surface opposite to said holding member and being formed to permit said locking member to penetrate through the central portion of said receiving member, said receiving member and holding member receiving between them a portion of said saddle frame, said lower surface of said receiving member having a spherical profile to mate with the spherical surface of said support member, so that said saddle having its frame clamped by said clamping mechanism is rotatable around the lengthwise axis of said locking member and is adjustable in its vertical angle both longitudinally and laterally of a frame of said bicycle, said washer being interposed between the head of said bolt and the lower surface of said support member, said washer having an upper surface opposite to the lower surface of said support member and a lower surface opposite to said bolt head, said seat post having at an upper portion thereof a holding mechanism for engaging with said washer to maintain said clamping mechanism in its adjusted position with respect to said support member.

2. A saddle support device according to claim 1, wherein the lower surface of said support member and the upper surface of said washer in contact with the lower surface of said support member have spherical profiles.

3. A saddle support device according to claim 3, wherein said spherical lower surface of said support member has a larger radius than said spherical upper surface of said washer.

4. A saddle support device according to claim 1, wherein the lower surface of said support member and the upper surface of said washer in contact with the lower surface of said support member have a cylindrical profile around the axis perpendicularly intercrossing with the lengthwise axis of said locking member.

5. A saddle support device according to claim 1, wherein the head of said bolt has a surface opposite to the lower surface of said washer, and the lower surface of said washer and said opposite surface at said head of said bolt have a spherical profile.

6. A saddle support device according to claim 5, wherein said spherical lower surface of said washer has a larger radius than said spherical opposite surface at the head of said bolt.

7. A saddle support device according to claim 1, wherein said holding mechanism comprises a screw member.

* * * * *